United States Patent [19]

Fuller

[11] Patent Number: 5,308,012
[45] Date of Patent: May 3, 1994

[54] FOLDING WIRECART CONVERTIBLE INTO FLOAT AND HANDTRUCK

[76] Inventor: Carsen S. Fuller, 3818 Kinsley Dr., Winter Park, Fla. 32792

[21] Appl. No.: 885,961

[22] Filed: May 20, 1992

[51] Int. Cl.⁵ .......................................... B65H 75/40
[52] U.S. Cl. ............................ 242/86.5 R; 280/47.19
[58] Field of Search ............... 242/85, 86, 86.1, 86.2, 242/86.5 R, 127, 128, 129, 129.5, 129.6, 129.7; 280/47.19, 47.26, 651, 652

[56] References Cited

U.S. PATENT DOCUMENTS

| | | | |
|---|---|---|---|
| D. 269,388 | 6/1988 | Smith et al. | D34/24 |
| D. 283,171 | 3/1986 | Smith et al. | D34/21 |
| D. 295,100 | 4/1988 | Talton | D34/24 |
| 610,494 | 9/1898 | Nelson | 242/86.5 R |
| 2,705,114 | 3/1955 | Worsham | 242/86.5 R |
| 2,828,928 | 4/1958 | Kollisch | 242/128 X |
| 3,134,555 | 5/1964 | Baker | 242/86.5 R |
| 3,765,619 | 10/1973 | Stillman | 242/129.5 |
| 3,831,877 | 8/1974 | Bennett et al. | 242/129 X |
| 3,854,509 | 12/1974 | Bailey | 242/86.5 R |
| 3,856,230 | 12/1974 | Zimmer | 242/86.5 R |
| 3,902,679 | 9/1975 | Bost | 242/129 |
| 3,990,653 | 11/1976 | Marcell | 242/129.8 |
| 4,172,608 | 10/1979 | Brown, Jr. | 242/85 |
| 4,202,509 | 5/1980 | Horn | 242/86.5 R |
| 4,391,422 | 7/1983 | McDonald | 242/86.5 R |
| 4,457,527 | 7/1984 | Lowery | 242/86.5 R |
| 4,552,323 | 11/1985 | Otis | 242/86.5 R |
| 4,564,152 | 1/1986 | Herriage | 242/86.5 R |
| 4,579,358 | 4/1986 | Bufield, Jr. | 242/86.5 R |
| 4,585,130 | 4/1986 | Brennan | 242/129.6 X |
| 4,591,109 | 5/1986 | Kremer | 242/129 |
| 4,736,899 | 4/1988 | Muraski | 242/86.5 R |
| 4,746,078 | 5/1988 | Setzke | 242/129.6 X |
| 4,917,322 | 4/1990 | Combs | 242/86.5 R |

OTHER PUBLICATIONS

1990 Greenlee Textron Catalogue, pp. 83-5 showing wire dispensers. (no date available).
Wyrecart promotional card, date unknown showing Wyrecart #550 and #60 (1 pg.).

Primary Examiner—Daniel P. Stodola
Assistant Examiner—John P. Darling
Attorney, Agent, or Firm—Paul S. Rooy

[57] ABSTRACT

A folding wirecart convertible into float and handtruck is comprised of a body rotatably attached to a base. The folding wirecart convertible into float and handtruck is equipped with main wheels and a handtruck handle whereby said base may be used as a cargo floor to transport a load. Additionally, the folding wirecart convertible into float and handtruck has a float handle and swivel wheels whereby the folding wirecart convertible into float and handtruck may be used in a float configuration. A float load support bar and a float load holder may be employed to facilitate the transport of long items in the float configuration. Axles with set screw collars sized to accommodate standard wire spools allow the folding wirecart convertible into float and handtruck to be used to dispense wire; removable wings augment the wire spool support capacity of the folding wirecart convertible into float and handtruck and may also be used as the floor of the float.

13 Claims, 5 Drawing Sheets

FOLDING WIRECART CONVERTIBLE INTO FLOAT AND HANDTRUCK

BACKGROUND OF THE INVENTION

1. Field of the Invention

The present invention relates to wirecarts and in particular to a folding wirecart convertible into a float and handtruck.

2. Background of the Invention

The discovery of electricity and its subsequent reduction to general use required the installation of large quantities of differently sized electrical wire.

Current wire installation practice involves the transport of a wide variety of wire installation tools, as well as the wire itself, to the work site. The scope of wire installation may vary all the way from the re-wiring of an existing structure, through wire installation in new single-family subdivision or multifamily apartment or condominium construction, to large commercial and industrial installations in structures having hundreds of thousands of square feet in area.

Once the tools and wire are on site, the spools of wire must be rotatably held in place in order to allow the wire they hold to be dispensed for installation.

Finally, after the wire installation work is complete, the tools and remaining wire must be transported back to where they were stored prior to the job, and the means of transporting these supplies securely stored.

TRANSPORTATION OF SUPPLIES

Typically, the wire installation tools and wire to be installed must be transported from the electrician's work truck, from large locking gangboxes remotely located from the wire installation location, or from tool crib/construction materials semitrailers parked outside the structure under construction. The distance these heavy supplies must be moved may range from a few yards to a quarter mile or more.

The tools to be transported may weigh thousands of pounds and include wire-pulling ropes, wire-pulling wire, power tuggers to pull wire, bending equipment kits for pipe and conduit, lead wire mice, ladders, drills, drill motors, drill bits, pliers, hammers, screwdrivers, wire cutters, channel lock pliers, levels, cable cutters, pulleys and slings to use for pulling wire, mouse-propelling jet air bottles, extension cords, band saws, fish tapes, wire lubrication, rags, electrical tape, wire markers, blue prints, etc . . . .

The materials to be transported may weigh additional thousands of pounds and include conduit, pipe, connectors, straps, couplings, light fixtures, electrical wire typically ranging in size from 8- 16 gage multi-strand data communications and sound system wire, switches, speakers, electrical receptacles, switch plate covers, intercom systems, data communications systems, drinking water, fittings, transformers ranging in size from small interior transformers to exterior pad or pole mounted units, switch gear, breaker boxes, breakers, power poles, etc . . . .

WIRE DISPENSING

Dispensing the wire during installation is not a trivial problem.

Sometimes dozens of heavy wire spools must be rotatably held in place in order to dispense the different wire sizes required to complete a job. Wire may range from 8-16 gage, from single to multi-conductor, from wire easily pulled through conduit to wire whose installation requires the use of a power tugger.

HISTORICAL APPROACHES

Step ladders have been used to support a horizontal axle bearing wire spools. This method of dispensing wire has a number of drawbacks: the step ladders tend to fall over, the step ladders are unusable for other purposes while the wire is being dispensed and only a limited number of spools can be accommodated in this manner.

U.S. Pat. No. 3,990,653 was granted Marcell for a Wheeled Cart for Carrying and Dispensing Wire. This cart provides only limited tool and other supplies transportation capability, cannot accommodate standard wire spools and does not fold to aid its storage and transportation. In addition, only a limited number of wire containers can be housed in this invention.

Zimmer was granted U.S. Pat. No. 3,856,230 for a Wire Dispensing Cart. No tool and supplies transport capability is taught, the Cart does not fold for storage and/or transportation and only a limited number of wire spools can be accommodated.

U.S. Pat. No. 3,765,619 was granted Stillman for a Carrying and Dispensing Device for Box Contained Wire. This Device cannot accommodate standard wire spools, does not fold, and no provisions to transport tools and other supplies is disclosed.

U.S. Pat. No. Des. 295,100 was granted Talton et al. for an Electrician's Wire Dispensing Cart and U.S. Pat. No. Des. 269,388 was granted Smith et al. for a Wire Handling Cart. While both these inventions can accommodate a limited number of standard wire spools, neither teaches a capability to transport tools and other supplies or to fold.

Therefore a need exists for a folding wire cart capable of dispensing wire from a large number of spools, which also has provisions to transport electrician's tools and supplies.

SUMMARY OF THE INVENTION

Accordingly, it is an object of this invention to provide a folding wirecart convertible into float and handtruck capable of accommodating a large number of standard wire spools. Design features permitting the accomplishment of this object include a plurality of axles, wings capable of supporting additional wire spools and provisions to mount axles between two or more folding wirecarts convertible into float and handtruck positioned side by side. Benefits associated with the achievement of this object include reduced setup and wire installation time.

Another object of this invention is to provide a folding wirecart convertible into float and handtruck capable of being used to transport electrician's tools and supplies. Features enabling this object include main wheels and a handtruck handle permitting the use of the present invention in a vertical orientation as a handtruck, and swivel wheels, the use of the wings as a float floor and a float handle which permits the use of the instant invention in a horizontal orientation as a float. Benefits associated with the accomplishment of this object include reduced transportation time along with the associated savings in time and money.

It is still a further object of this invention to provide a folding wirecart convertible into float and handtruck which may be folded for storage and transportation.

Features allowing this object to be achieved include a cart body rotatably attached to a cart base. Benefits associated with the accomplishment of this object include reduced storage and transportation space requirements, along with the associated cost savings of reduced cart transport and cart storage capacity requirements.

It is a further object of this invention to provide a folding wirecart convertible into float and handtruck manufactured of readily available and inexpensive materials, so as to make the instant invention readily affordable.

BRIEF DESCRIPTION OF THE DRAWINGS

The invention, together with the other objects, features, aspects and advantages thereof will be more clearly understood from the following in conjunction with the accompanying drawings.

Five sheets of drawings are provided. Sheet one contains FIGS. 1, 1A and 1B. Sheet two contains FIGS. 2 and 3. Sheet three contains FIGS. 4, 5, 6 and 7. Sheet four contains FIG. 8. Sheet five contains FIGS. 9 and 10.

DETAILED DESCRIPTION OF THE PREFERRED EMBODIMENT

Figures 1, 1A, 1B:
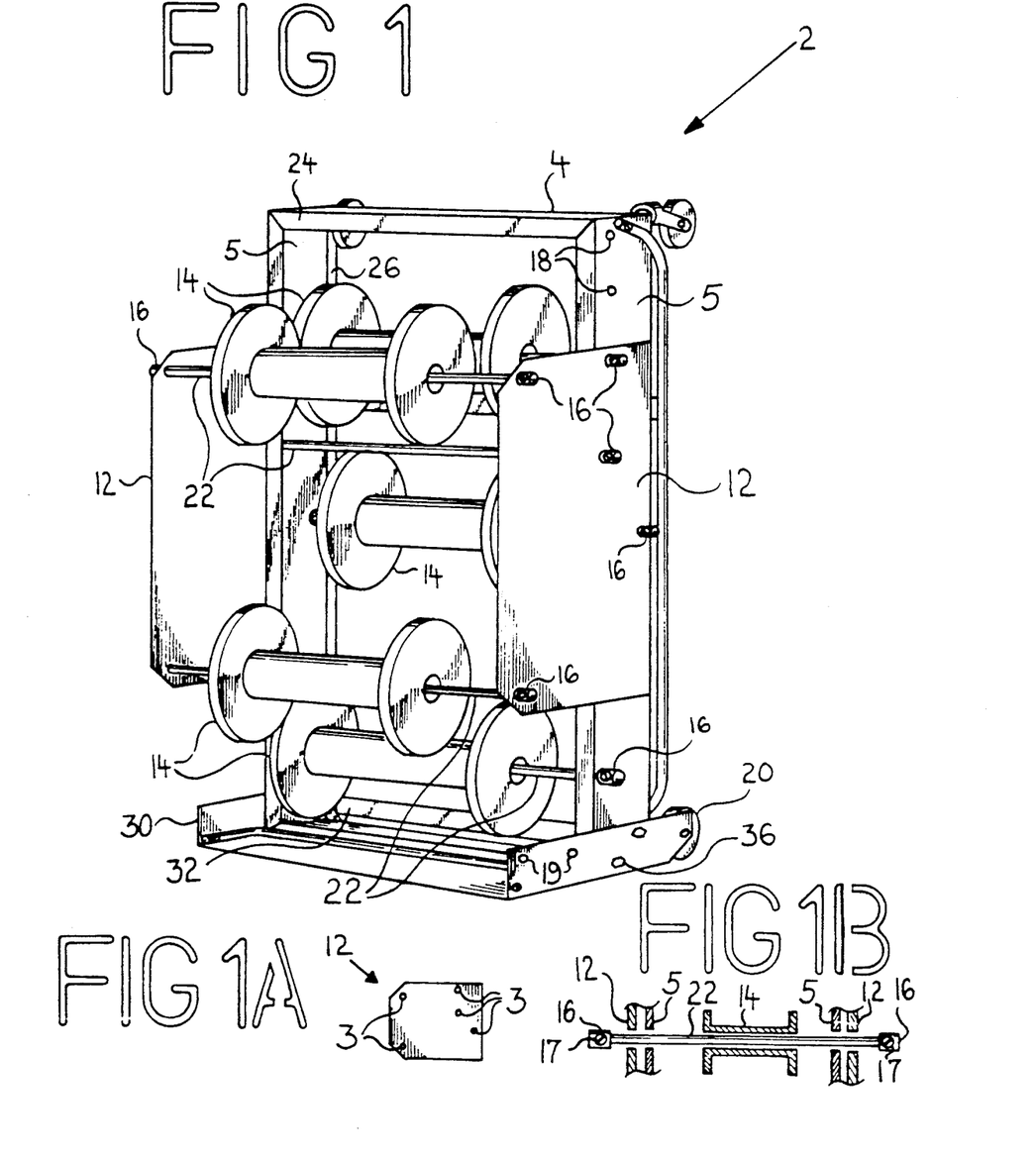
FIG. 1 is a front isometric view of the folding wirecart convertible into float and handtruck in the wire dispensing configuration with two wings installed.
FIG. 1A is a top view of a wing.
FIG. 1B is a cut away view of an axle installation with wings.

Referring now to FIG. 1 we see a front isometric view of folding wirecart convertible into float and handtruck 2. The two main components are body 4 rotatably attached to base 30 at pivot fastener 36.

Figure 6:
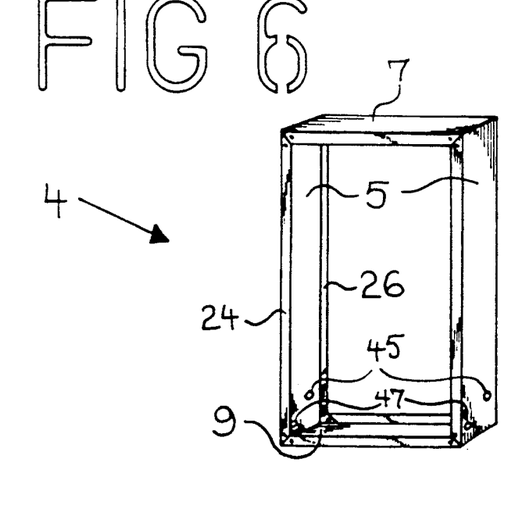
FIG. 6 is a front isometric view of the body.

Referring now also to FIG. 6, body 4 is rectangular when viewed from the front, having body sides 5, body top 7 and body bottom 9. Body front lip 24 is perpendicular to body sides 5, body top 7 and body bottom 9. Body rear lip 26 is disposed on the side of body 4 opposite body front lip 24, and is also perpendicular to body sides 5, body top 7 and body bottom 9.

Body sides 5 have body punchouts 18 sized to admit passage to axles 22, body pivot fastener holes 47 and body lock bolt holes 45. Axles 22 are sized so as to rotatably accommodate standard wire spools 14.

Figures 2, 3:
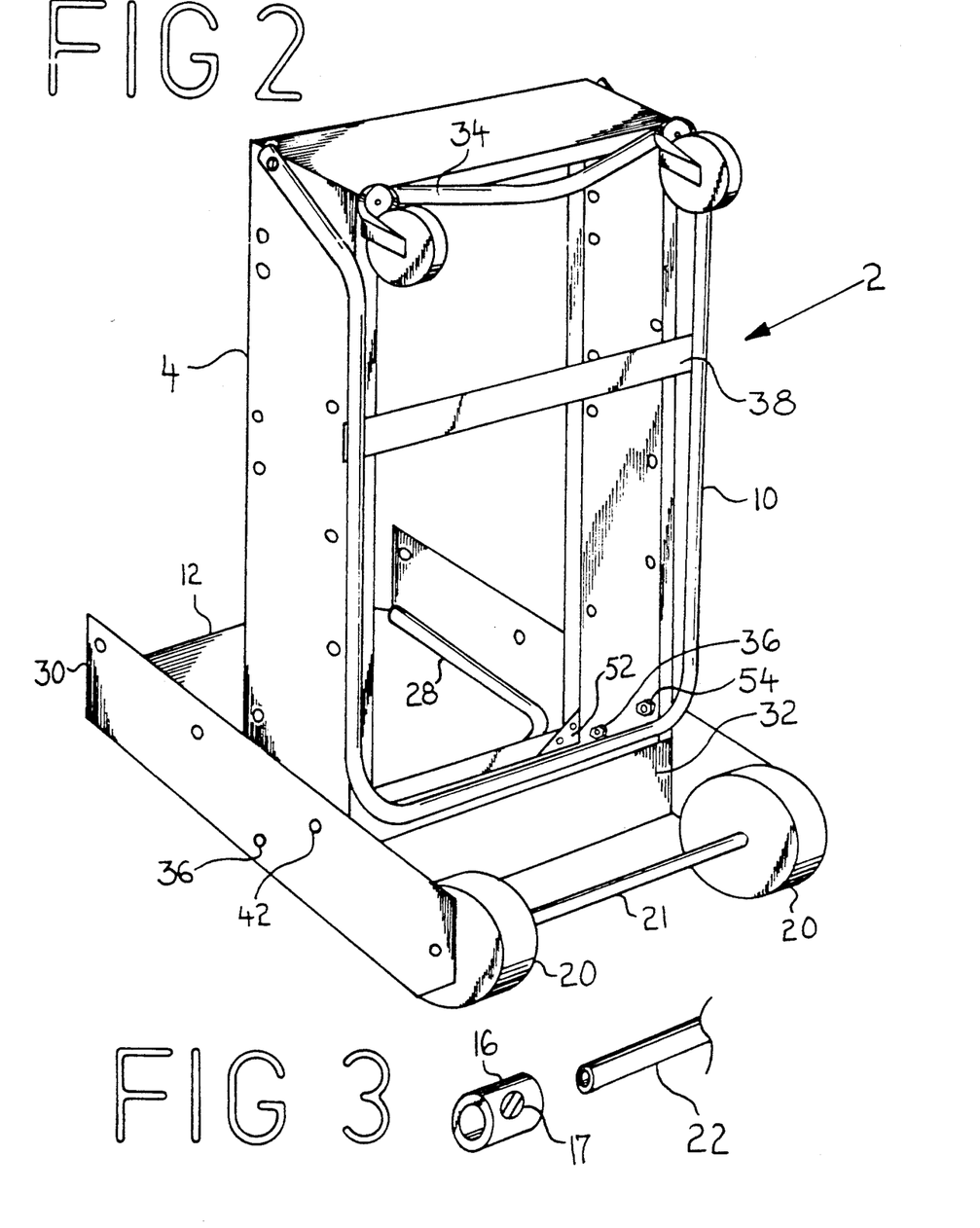
FIG. 2 is a rear isometric view of the folding wirecart convertible into float and handtruck in the handtruck configuration.
FIG. 3 is a front isometric detail of the end of an axle and a collar.

Set screw collars 16 having set screws 17 slide onto the ends of axles 22 as depicted in FIG. 3, and then set screws 17 are tightened, thus non-frictionally constraining body sides 5 and wire spools 14 between set screw collars 16.

Wings 12 are attached to body sides 5 in as is illustrated in FIG. 1A and cross sectional detail FIG. 1B: wings 12 have wing punchouts 3 corresponding to body punchouts 18 in body sides 5. An axle 22 is slid through a wing punchout 3 in a first wing 12, then through the corresponding body punchout 18 in body side 5, then through the corresponding body punchout 18 in the other body side 5, and finally through the corresponding wing punchout 3 in the second wing 12. Set screw collars 16 are then slid onto each end of axle 22 and the set screws 17 tightened, thereby sandwiching each wing 12 securely between a set screw collar 16 and a body side 5.

Figure 7:
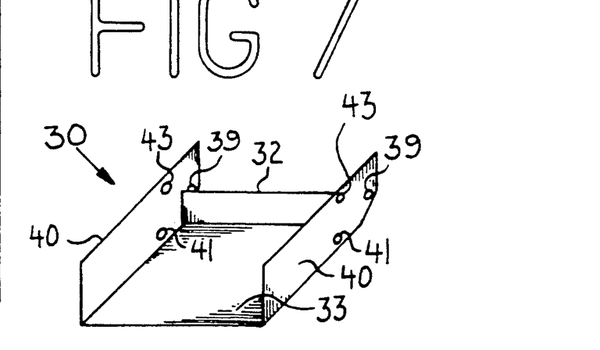
FIG. 7 is a front isometric view of the base.

Referring now also to FIG. 7, base 30 is comprised of base floor 33, two base walls 40 disposed at opposite ends of base floor 33 perpendicular to base floor 33, and base stop 32 disposed between and perpendicular to base walls 40.

Base walls 40 contain main wheel axle holes 39, base lock bolt holes 43 and base pivot fastener holes 41. Main wheel axle 21 is installed through main wheel axle holes 39, and supports main wheels 20 (see FIG. 2).

FIG. 2 is a rear isometric view of folding wirecart convertible into float and handtruck 2 in the handtruck configuration. By grasping handtruck handle 34 and tilting the folding wirecart convertible into float and handtruck 2 backward, the entire weight of folding wirecart convertible into float and handtruck 2 rests on main wheels 20 and the folding wirecart convertible into float and handtruck 2 may be moved (along with whatever load has been placed in it) simply by pushing or pulling handtruck handle 34.

Wings 12 have been pushed between float load holder 28 and base floor 33 until butting against base stop 32, thereby increasing the handtruck floor area available to carry load while simultaneously storing wings 12.

Reinforcement plate 52 is triangular and may be used to strengthen the corners of body front lip 24 and body rear lip 26.

The method of attaching body 4 to base 30 may be seen more clearly by referring to FIGS. 2, 6 and 7. Each of two pivot fasteners 36 extends through a base pivot fastener hole 41 and a body pivot fastener hole 47, thereby rotatably attaching body 4 to base 30. Each of two lock bolts 42 extends through a base lock bolt hole 43 and a body lock bolt hole 45, and then threads into lock nut 54, thereby fixing the angular relationship between body 4 and base 30. Lock nut 54 may be of the butterfly nut variety to facilitate its removal. Pivot fastener 36 may be a standard bolt and locknut.

Figure 5:
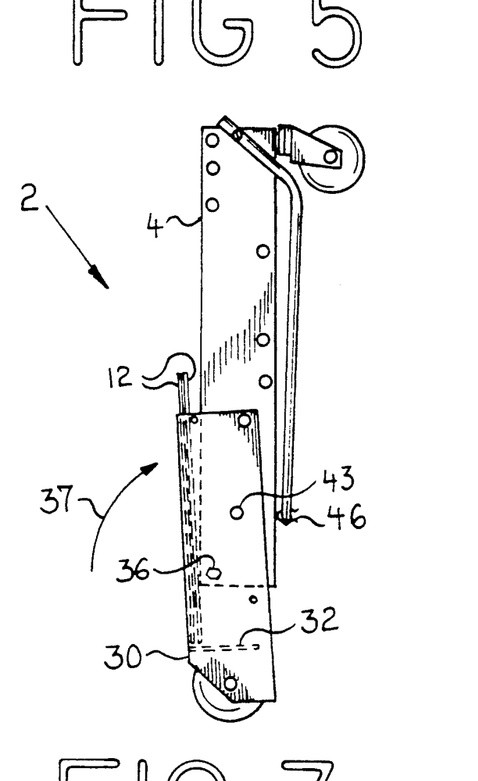
FIG. 5 is a side view of the folding wirecart convertible into float and handtruck in the folded position.

The removal of lock nuts 54 and lock bolts 42 allows body 4 to rotate relative to base 30 into a space-saving storage configuration, as illustrated by arrow 37 in FIG. 5.

Figure 4:
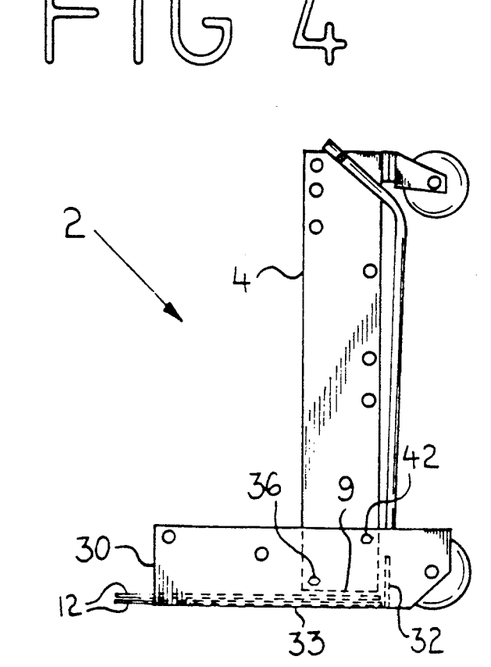
FIG. 4 is a side view of the folding wirecart convertible into float and handtruck in the handtruck configuration with two wings stowed.

Referring now to FIGS. 4 and 5, wings 12 may be observed in the stored position between body bottom 9 and base floor 33, butted against base stop 32.

To return folding wirecart convertible into float and handtruck 2 into the unfolded configuration depicted in FIGS. 1 and 2, reverse the steps depicted in FIGS. 4 and 5 by rotating body 4 relative to base 30 opposite the sense of arrow 37 until body 4 rotationally butts up against base stop 32. Slide lock bolts 42 through base lock bolt holes 43 and body lock bolt holes 45, then tighten lock nuts 54 onto lock bolts 42.

Figure 8:
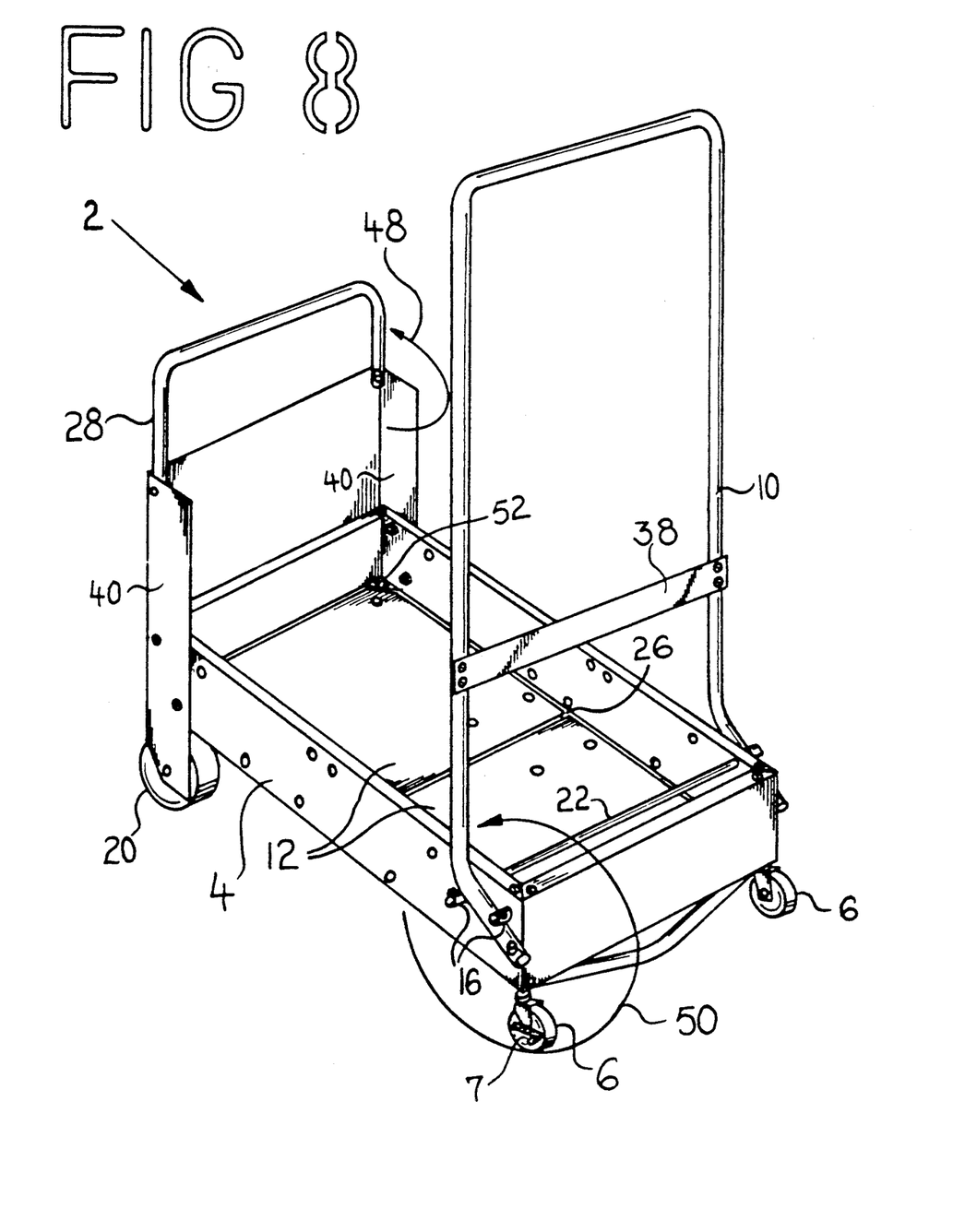
FIG. 8 is a front isometric view of the folding wirecart convertible into float and handtruck in the float configuration.

FIG. 8 is a front isometric view of folding wirecart convertible into float and handtruck 2 in the float configuration. Wings 12 have been positioned within body 4 and are securely supported by body rear lip 26.

Float load holder 28 is rotatably attached to base walls 40, and has been rotated approximately 180 degrees into a vertical position as indicated by arrow 48. The rotatable attachment between float load holder 28 and base walls 40 is sufficiently frictional so as to hold float load holder 28 in position.

Float handle 10 has been disengaged from float handle bracket 46 (see FIG. 5) and rotated approximately 270 degrees into a vertical position as indicated by arrow 50. The vertical orientation of float handle 10 is maintained by set screw collars 16 secured on the ends of axles 22 passing through appropriately positioned body punchouts 18.

The folding wirecart convertible into float and handtruck 2 in float configuration may be easily moved about by virtue of float handle 10, main wheels 20 and swivel wheels 6. Should it be desired to immobilize folding wirecart convertible into float and handtruck 2 in float configuration, a swivel wheel 6 is equipped with a swivel wheel lock 7 which, when engaged, prevents the rotation of the swivel wheel 6.

Figure 9:
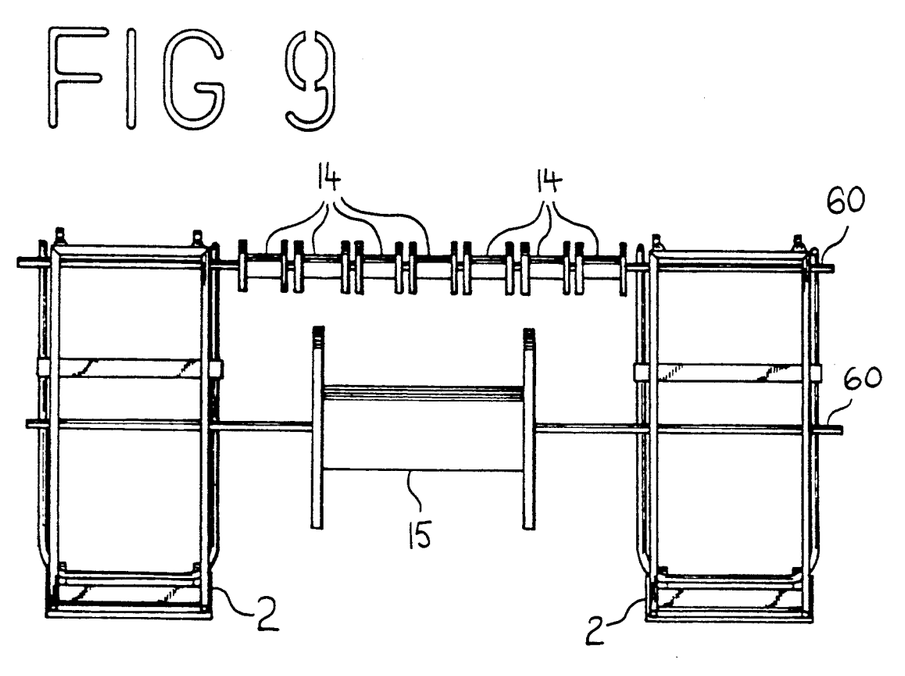
FIG. 9 is a front view of two folding wirecarts convertible into float and handtruck positioned side by side supporting a plurality of wire spools rotatably mounted on long axles between them.

FIG. 9 is a front view of two folding wirecarts convertible into float and handtruck 2 positioned side by side supporting a large number of wire spools 14 and one big wire spool 15 on long axles 60 passing through corresponding body punchouts 18 (base punchouts 19 may also be used for this purpose) in the two folding wirecarts convertible into float and handtruck 2. Additional folding wirecarts convertible into float and handtruck 2 may be placed along side those depicted in FIG. 10, and additional long axles 60 emplaced, in order to accommodate more wire spools.

If desired, folding wirecarts convertible into float and handtruck 2 thus laterally positioned may be moved en masse by placing a worker grasping the corresponding handtruck handle 34 behind each folding wirecart convertible into float and handtruck 2, tilting backwards, and pushing the folding wirecarts convertible into float and handtruck 2 to the new location in concert.

Figure 10:
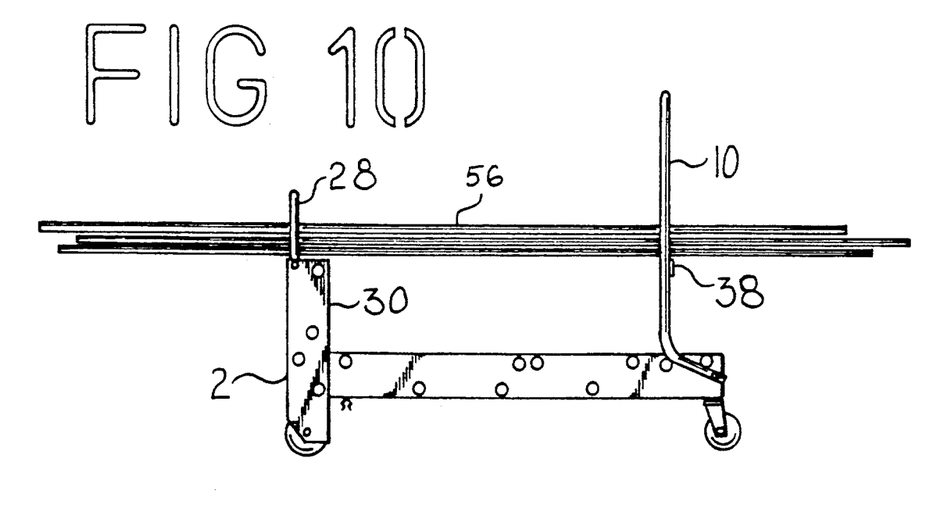
FIG. 10 is a side view of a folding wirecart convertible into float and handtruck in the handtruck configuration being used to transport a load of ten foot sections of conduit.

FIG. 10 is a side view of folding wirecart convertible into float and handtruck 2 in the float configuration being used to transport lengthy items—in this case a load of 10 foot conduit pipe 56. The pipe rests on float load support bar 38 and base 30, and is laterally constrained by float handle 10 and float load holder 28.

A large variety of long materials and tools such as ladders, lumber, steel pipe, etc. may be transported in this manner.

Folding wirecart convertible into float and handtruck 2 may be manufactured of readily available sheet steel and steel pipe. Main wheels 20 and swivel wheels 6 (including wheel lock 7) are commercially available. All fasteners are readily commercially available.

While a preferred embodiment of the invention has been illustrated herein, it is to be understood that changes and variations may be made by those skilled in the art without departing from the spirit and scope of the appending claims.

I claim:

1. A folding wirecart convertible into float and handtruck comprising a body rotatably attached to a base, said body comprising two body sides, a body top, and a body bottom, said base comprising a rectangular base floor, and each said body side further comprises a plurality of body punchouts, a body pivot fastener hole and a body lock bolt hole, and said base further comprises two base walls rigidly attached to opposite sides of said base floor.

2. A folding wirecart convertible into float and handtruck comprising a body rotatably attached to a base, said body comprising:
   two body sides having a plurality of body punchouts, a body pivot fastener hole, and a body lock hole,
   a body top,
   a body bottom,
   a body front lip rigidly attached to and perpendicular to said body sides, body tip and body bottom, and
   a body rear lip disposed on the opposite side of said body from said body front lip rigidly attached to and perpendicular to said body sides, body top and body bottom, and
said base comprising:
   a rectangular base floor,
   two base walls perpendicular to said base floor rigidly attached to opposite sides of said base floor, and
   a base stop rigidly attached to and perpendicular to said base floor disposed between and perpendicular to said base walls.

3. The folding wirecart convertible into float and handtruck of claim 3 wherein each said base walls further comprises:
   a plurality of base punchouts,
   a base pivot fastener hole, and
   a base lock bolt hole.

4. The folding wirecart convertible into float and handtruck of claim 4 wherein a part of said body is disposed within said base walls and rotatably attached to said base by means of pivot fasteners through said body pivot fastener holes and said base pivot fastener holes, said body being roughly perpendicular to said base when said body rotationally butts up against said base stop, and lock bolts secured by lock nuts are disposed within said body lock bolt holes and said base lock bolt holes.

5. The folding wirecart convertible into float and handtruck of claim 4 wherein said base may be rotated until approximately parallel to said body when said lock bolts and lock nuts are removed, thereby allowing said folding wirecart convertible into float and handtruck to be folded for storage and transportation.

6. The folding wirecart convertible into float and handtruck of claim 4 wherein said body further comprises:
   swivel wheels attached to the end of said body opposite the end of said body said base is rotatably attached to,
   a float handle having at least one float load support bar rotatably attached to said float body, and
   a float load holder rotatably attached to said body.

7. The folding wirecart convertible into float and handtruck of claim 6 wherein at least one said swivel wheels is equipped with a swivel wheel lock whereby said folding wirecart convertible into float and handtruck may be immobilized.

8. The folding wirecart convertible into float and handtruck of claim 7 wherein at least one corner of said body front lip is reinforced with a reinforcement plate, and at least one corner of said body rear lip is reinforced with a reinforcement plate.

9. The folding wirecart convertible into float and handtruck of claim 8 wherein said body further comprises a float handle bracket.

10. The folding wirecart convertible into float and handtruck of claim 2 wherein said body further comprises:
- a plurality of axles sized to fit standard wire spools and freely slide through said body punchouts, each said axle being disposed within one said body punchout in one said body side and one said body punchout in the other said body wall, the ends of said axles protruding beyond the confines of said body whereby set screw collars sized to fit said axles may be attached, and
- at least one said set screw collar on each end of each said axle, each said set screw collar being equipped with a set screw, said set screw being tightened onto said axle, thereby constraining said body between the set screw collars at each end of a given said axle.

11. The folding wirecart convertible into float and handtruck of claim 10 wherein said body further comprises wings installable external to said body and approximately parallel to said body sides, said wings having a plurality of wing punchouts sized to admit free passage to said axles, some of said wing punchouts sharing a common axle with said body, each said wing being held in close proximity to one said body side by virtue of being sandwiched between one said set screw collar and one said body side.

12. The folding wirecart convertible into float and handtruck of claim 2 wherein said base further comprises:
- main wheels rotatably attached to said base walls,
- a handtruck handle rigidly attached to said body,
- a plurality of axles sized to fit standard wire spools and freely slide through said base punchouts, each said axle being disposed within one said base punchout in one said base wall and one said base punchout in the other said base wall, the ends of said axles protruding beyond the confines of said base whereby set screw collars sized to fit said axles may be attached, and
- at least one said set screw collar on each end of each said axle, said set screw collar being equipped with a set screw, said set screw being tightened onto said axle, thereby constraining said base between the set screw collars at each end of a given said axle.

13. A plurality of folding wirecarts convertible into float and handtruck positioned side by side connected by long axles disposed within body punchouts, said long axles being sized to pass freely through said body punchouts and standard wire spools, whereby a plurality of of wire spools may be held rotatably on said long axle in order to dispense their wire, each said folding wirecart convertible into float and handtruck comprising a body rotatably attached to a base, said body comprising:
- two body sides having a plurality of body punchouts, a body pivot fastener hole, and a body lock hole,
- a body top,
- a body bottom,
- a body front lip rigidly attached to and perpendicular to said body sides, body top and body bottom, and
- a body rear lip disposed on the opposite side of said body from said body front lip rigidly attached to and perpendicular to said body sides, body top and body bottom, and said base comprising:
- a rectangular base floor,
- two base walls perpendicular to said base floor rigidly attached to opposite sides of said base floor, and
- a base stop rigidly attached to and perpendicular to said base floor disposed between and perpendicular to said base walls.

* * * * *

UNITED STATES PATENT AND TRADEMARK OFFICE
CERTIFICATE OF CORRECTION

PATENT NO. : 5,308,012
DATED : May 3, 1994
INVENTOR(S) : Carsen S. Fuller It is certified that error appears in the above-identified patent and that said Letters Patent is hereby corrected as shown below:

Column 1, Line 49: "...blue prints, etc...." should be "...blue prints, etc.".

Column 1, Line 53: "...8-16 gage multi-strand..." should be "...8-16 gage, multi-strand...".

Column 6, Line 31: "...claim 3..." should be "...claim 2...".

Column 6, Line 37: "...claim 4..." should be "...claim 3...".

Column 6, Line 53: "...claim 4..." should be "...claim 3...".

Signed and Sealed this

Fourth Day of October, 1994

Attest:

BRUCE LEHMAN

Attesting Officer     Commissioner of Patents and Trademarks